(12) United States Patent
Sprainis et al.

(10) Patent No.: US 8,096,431 B2
(45) Date of Patent: Jan. 17, 2012

(54) COMBINATION YOKE AND ELASTOMERIC DRAFT GEAR HAVING A FRICTION MECHANISM

(75) Inventors: Ronald J. Sprainis, Springfield, OR (US); Michael E. Ring, Saint John, IN (US); Bradley Anderson, Des Plaines, IL (US); Jonathon Marlow, Hobart, IN (US); David Meyer, Lebanon, PA (US); Michael Moriarity, Lansing, IL (US); Wajih Kanjo, Homer Glen, IL (US)

(73) Assignee: WABTEC Holding Corp, Wilmerding, PA (US)

( * ) Notice: Subject to any disclaimer, the term of this patent is extended or adjusted under 35 U.S.C. 154(b) by 300 days.

(21) Appl. No.: 12/150,808

(22) Filed: May 1, 2008

(65) Prior Publication Data
US 2008/0272079 A1 Nov. 6, 2008

Related U.S. Application Data

(60) Provisional application No. 60/926,987, filed on May 1, 2007.

(51) Int. Cl.
*B61G 9/00* (2006.01)
(52) U.S. Cl. .............. 213/26; 213/22; 213/45; 213/32 R
(58) Field of Classification Search .................... 213/22, 213/32 A, 32 R, 45, 47, 67 R, 68, 69, 70
See application file for complete search history.

(56) References Cited

U.S. PATENT DOCUMENTS

| | | | | |
|---|---|---|---|---|
| 761,795 A * | 6/1904 | Townsend | ................... | 213/32 A |
| 1,852,486 A * | 4/1932 | Sleeman | ................... | 213/32 R |
| 2,776,057 A * | 1/1957 | Blattner | ................... | 213/46 R |
| 2,791,337 A * | 5/1957 | Blattner | ................... | 213/45 |
| 2,801,010 A * | 7/1957 | Willison | ................... | 213/45 |
| 2,817,445 A * | 12/1957 | Campbell | ................... | 213/32 R |
| 2,858,030 A * | 10/1958 | Mulcahy | ................... | 213/45 |
| 3,799,360 A * | 3/1974 | Huml et al. | ................... | 213/22 |
| 3,840,126 A * | 10/1974 | Domer | ................... | 213/45 |
| 4,095,065 A * | 6/1978 | Akers | ................... | 200/400 |
| 4,198,037 A * | 4/1980 | Anderson | ................... | 267/153 |
| 4,681,040 A * | 7/1987 | Brodeur et al. | ................... | 105/3 |
| 4,706,826 A * | 11/1987 | Elliott et al. | ................... | 213/61 |
| 4,848,611 A * | 7/1989 | Terlecky et al. | ................... | 213/64 |
| 5,096,076 A * | 3/1992 | Elliott et al. | ................... | 213/67 A |
| 5,176,268 A * | 1/1993 | Manley | ................... | 213/56 |
| 5,305,899 A * | 4/1994 | Kaufhold | ................... | 213/50 |
| 5,312,007 A * | 5/1994 | Kaufhold et al. | ................... | 213/75 R |
| 5,351,844 A * | 10/1994 | Carlstedt | ................... | 213/44 |

(Continued)

FOREIGN PATENT DOCUMENTS
DE 1993283 9/1968

*Primary Examiner* — Joe Morano, IV
*Assistant Examiner* — Jason C Smith
(74) *Attorney, Agent, or Firm* — James Ray & Assoc

(57) ABSTRACT

A draft gear assembly for cushioning buff and draft dynamic impact forces being applied to a center sill member of the railway vehicle during make-up of a train consist and in-track operation of such train consist includes a resilient cushioning member and a friction mechanism both axially mounted within the yoke with the friction mechanism positioned between the front end of the resilient cushioning member and the front coupler follower. A pair of the resilient cushioning members with the friction mechanism mounted therebetween may also be provided.

22 Claims, 6 Drawing Sheets

U.S. PATENT DOCUMENTS

| | | | |
|---|---|---|---|
| 5,511,676 A * | 4/1996 | Holmes | 213/67 R |
| 6,446,820 B1 * | 9/2002 | Barker et al. | 213/75 R |
| 6,681,943 B2 * | 1/2004 | Barker et al. | 213/75 R |
| D578,039 S * | 10/2008 | Ely | D12/42 |
| 2005/0011852 A1 * | 1/2005 | Fetterolf et al. | 213/75 R |
| 2008/0272079 A1 * | 11/2008 | Sprainis et al. | 213/26 |
| 2008/0272081 A1 * | 11/2008 | Sprainis et al. | 213/40 R |

* cited by examiner

COMBINATION YOKE AND ELASTOMERIC DRAFT GEAR HAVING A FRICTION MECHANISM

This application is related to and claims priority from Provisional Patent Application Ser. No. 60/926,987 filed on May 1, 2007. This application is further closely related to co-pending U.S. Ser. No. 12/150,809 entitled "Compressible Elastomeric Spring", to co-pending U.S. Ser. No. 12/150,926 entitled "Plate For A Compressible Elastomeric Spring", to co-pending U.S. Ser. No. 12/150,928 entitled "Elastomeric Pad For A Compressible Elastomeric Spring", to co-pending U.S. Ser. No. 12/150,929 entitled "Method of Making Compressible Elastomeric Spring", to co-pending U.S. Ser. No. 12/150,925 entitled "Method Of Making Elastomeric Pad For A Compressible Elastomeric Spring", to U.S. Ser. No. 12/150,777 entitled "Combination Yoke and Elastomeric Draft Gear", to co-pending U.S. Ser. No. 12/150,927 entitled "Elastomeric Draft Gear Having Housing", filed concurrently herewith. These applications are being assigned to the assignee of the present invention and the disclosures of these applications are hereby incorporated by reference thereto.

FIELD OF THE INVENTION

The present invention relates, in general, to draft gear assemblies for railway vehicles and, more particularly, this invention relates to a draft gear assembly installed within the yoke of the railway vehicle and having at least one compressible elastomeric spring and a cooperating friction mechanism.

BACKGROUND OF THE INVENTION

Draft gear assemblies for cushioning buff and draft shocks encountered during make-up and operation of a railway vehicle are well known in the art to include a housing having a closed end and an open end, a compressible member disposed within the closed end and a friction mechanism disposed within the open end. Lately, various railroads and operators of railway vehicles have been seeking both the increased loading of the railway vehicles and capability of the draft gear assembly to withstand higher dynamic impact loads.

Prior to the conception and design of the present invention, efforts have been made to eliminate the draft gear housing in order to increase the loading capacity of the railway vehicle. U.S. Pat. No. 6,446,820 issued to Barker et al. discloses one type of such effort, wherein the draft gear assembly which has a yoke, a coupler follower, a rear follower, a front resilient member and a back resilient member. The yoke has top and bottom stops. The coupler follower is biased against the yoke top and bottom stops. The draft gear assembly also includes a center rod that extends through the yoke, through the back resilient member and through the rear follower. The rear end of the center rod is threaded and receives a threaded fastener to retain the rear follower and the back resilient member. However, it has been found that during repetitive use the center rod is not sufficient to maintain axial alignment of the back resilient member resulting in loss of lateral stability of pads and plates and further resulting in decreased performance and decreased reliability of the draft gear assembly. It has been further found that this draft gear assembly does not resist overcompression of the back resilient member further resulting in decreased reliability and increased maintenance costs.

Therefore, there is a continuing need for a lighter and reliable draft gear assembly capable of absorbing high dynamic impact loads.

SUMMARY OF THE INVENTION

The invention provides a draft gear assembly for cushioning buff and draft shocks encountered during make-up and operation of a railway vehicle.

In accordance with one aspect of the invention, the draft gear assembly includes at least one compressible resilient spring member which is mounted within a yoke of such railway vehicle coaxial with a longitudinal axis thereof. The yoke is mounted within a hollow center sill of a railway vehicle body. A friction mechanism is also provided and is disposed in abutting engagement with one end of the at least one compressible resilient spring member. The friction mechanism is further disposed in abutting engagement with at least one predetermined portion of the yoke.

In accordance with another aspect of the invention, the draft gear assembly includes an elongated yoke removably mountable within a hollow center sill of a railway vehicle body. The yoke has a yoke head which is adapted to connect to an end of a coupler shank, a butt end axially opposing the yoke head, and a pair of elongated, substantially parallel spaced-apart top and bottom strap members. Each top or bottom strap member has an inner surface, an outer surface, a front end and a rear end. The rear end of each strap member is joined to the butt end of the yoke and the front end of each strap member is joined to the yoke head. A rear follower is positioned intermediate the top and the bottom strap members transversely to a longitudinal central axis of the yoke. The rear follower is sized to abut a draft gear seat formed within the butt end of the yoke and a pair of rear stops secured to the center sill when the draft gear assembly is in a position to cushion the buff shocks. A front coupler follower is also positioned intermediate the top and the bottom strap members transversely to the central axis of the yoke. The front coupler follower is sized to abut a pair of front stops formed in a striker casing engaging the center sill when the draft gear assembly is in a position to cushion the draft shocks. A compressible resilient spring member is mounted within the yoke concentric with the longitudinal axis thereof. The compressible resilient spring member has a rear end thereof abutting an inner surface of the rear follower. A friction mechanism is disposed in abutting engagement between a front end of the compressible resilient spring member and an inner surface of the front coupler follower.

In accordance with yet another aspect of the invention the draft gear assembly includes an elongated yoke removably mountable within a hollow center sill of a railway vehicle body. The yoke has a yoke head which is adapted to connect to an end of a coupler shank, a butt end axially opposing the yoke head, and a pair of elongated, substantially parallel spaced-apart top and bottom strap members. Each top or bottom member has an inner surface, an outer surface, a front end and a rear end. The rear end of each strap member is joined to the butt end of the yoke and the front end of each strap member being is joined to the yoke head. A rear follower is positioned intermediate the top and the bottom strap members transversely to a longitudinal central axis of the yoke. The rear follower is sized to abut a draft gear seat formed within the butt end of the yoke and a pair of rear stops secured to the center sill when the draft gear assembly is in a position to cushion the buff shocks. A front coupler follower is also positioned intermediate the top and the bottom strap members transversely to the central axis of the yoke. The front coupler follower is sized to abut a pair of front stops formed in a striker casing engaging the center sill when the draft gear assembly is in a position to cushion the draft shocks. A first compressible resilient spring member is mounted within the yoke coaxial with the longitudinal axis thereof, the first compressible resilient spring member has a rear end thereof abutting an inner surface of the rear follower. A second compressible resilient spring member is also mounted within the yoke coaxial with the longitudinal axis thereof. The second compressible resilient spring member has a front end thereof abutting an inner surface of the front coupler follower. A friction mechanism is disposed in abutting engagement between a front end of the first resilient spring member and a rear end of the second compressible resilient spring member.

OBJECTS OF THE INVENTION

It is, therefore, one of the primary objects of the present invention to provide a draft gear assembly for cushioning buff and draft shocks encountered in operation of a railway vehicle.

Another object of the present invention is to provide a draft gear assembly that employs a combination of a compressible elastomeric spring and a friction mechanism, both mounted within the yoke of the railway vehicle between the rear and front followers.

Yet another object of the present invention is to provide a draft gear assembly that will at least meet and even exceed all AAR requirements, presently in force, even though such draft gear assembly is lighter in weight.

A further object of the present invention is to provide a draft gear assembly that employs a combination of a compressible elastomeric spring and a friction mechanism disposed in abutting relationship with the yoke of such railway vehicle for maintaining axial alignment of the compressible elastomeric spring during use of the draft gear assembly.

An additional object of the present invention is to provide a draft gear assembly that employs a pair of compressible elastomeric springs mounted axially within the yoke of the railway car between the front coupler follower and the rear follower and which are separated by a friction mechanism.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
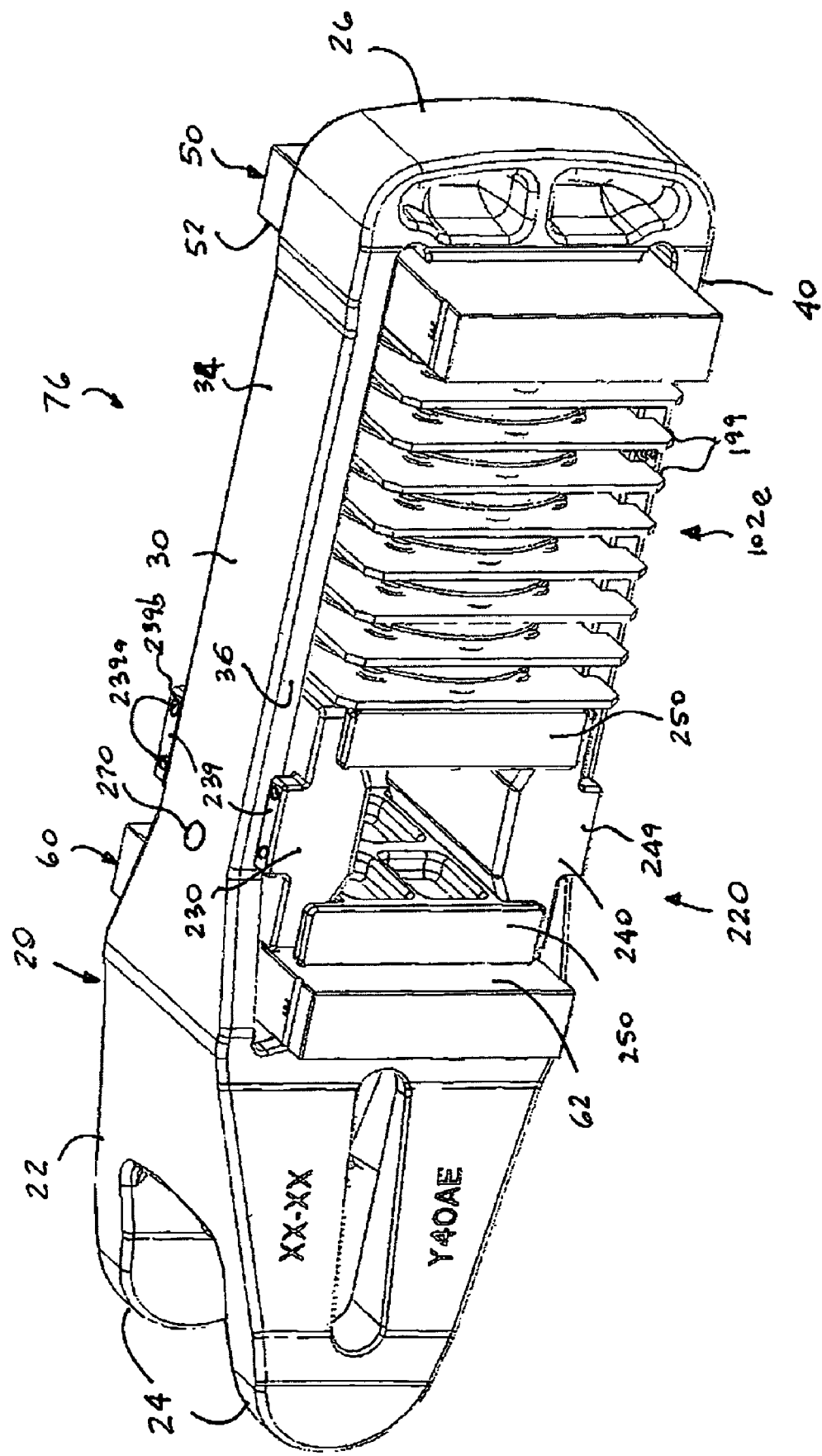
FIG. 1 is an isometric view illustrating a draft gear assembly which is constructed in accordance with one embodiment of the present invention.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of a railway vehicle applies but is not limited to passenger railcar, freight railcar, locomotive and the like railway vehicles.

The best mode for carrying out the invention is presented in terms of its various embodiments, herein depicted within FIGS. 1 through 6. However, the invention is not limited to the described embodiments, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only several particular configurations shall be shown and described for purposes of clarity and disclosure and not by way of limitation of scope.

The present invention provides a draft gear assembly for cushioning both buff and draft impact forces (shocks) being applied to a center sill member of a railway vehicle (not shown) during make-up of a train consist and in-track operation of such train consist. Furthermore, the draft gear assembly is used in combination with a conventional yoke, generally designated as 20, and generally mounted between a rear follower block, generally designated as 50, and a front coupler follower block, generally designated as 60. As is conventional, the yoke 20 is removably mounted within the hollow center sill 2 of a railway vehicle body (not shown).

The yoke 20 is illustrated as a conventional yoke for standard AAR E-type couplers, for example as disclosed in U.S. Pat. No. 4,095,065 issued to Elliott et al. and whose teachings are incorporated into this document by reference thereto. Briefly, the yoke 20 includes a yoke head 22 having a pair of keyslot walls 24. A butt end 26 of the yoke 20 axially opposes the yoke head 22 and has a conventional draft gear seat 28 formed therein. There is an elongated top strap member 30 which is disposed, in a conventional manner, between the yoke head 22 and the butt end 26. The top strap member 30 has a horizontally disposed flat inner surface 32, a horizontally disposed outer surface 34 and a pair of vertically disposed side edges 36. There is also an elongated bottom strap member 40 which is disposed, in a conventional manner, between the yoke head 22 and the butt end 26 and which is spaced apart from the top strap member 30 in a substantially parallel manner. Similarly, the bottom strap member 40 has a horizontally disposed flat inner surface 42, a horizontally disposed outer surface 44 and a pair of vertically disposed side edges 46.

As is also conventional in the art, the rear follower 50 is positioned intermediate the top and the bottom strap members, 30 and 40 respectively, and transversely to a longitudinal central axis 21 of the yoke 20. The rear follower 50 is sized to abut a seat 28 of the yoke 20 and a pair of rear stops 3 the draft gear assembly 70 is in a position to cushion the buff shocks.

Figure 3:
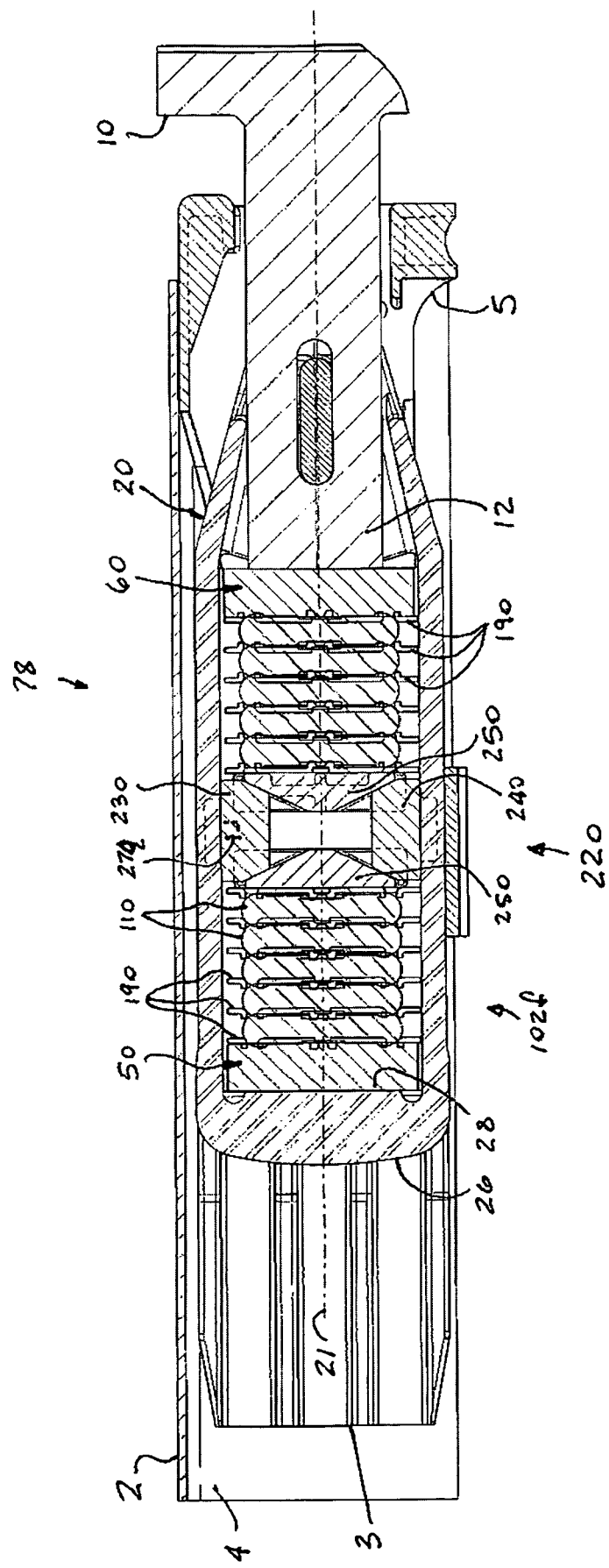
FIG. 3 is a cross-sectional elevation view of the draft gear assembly of FIG. 2.
Figure 5:
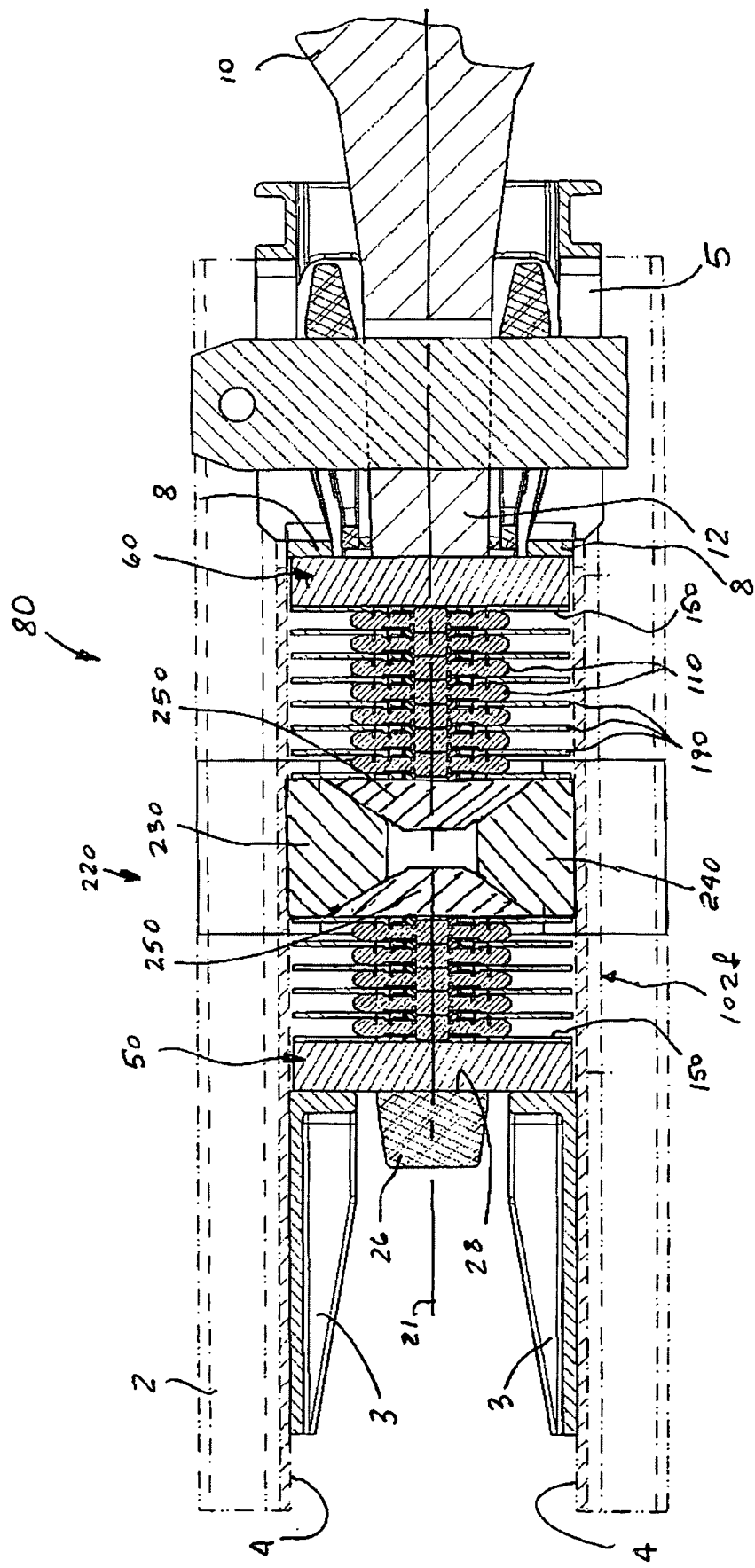
FIG. 5 is a cross-sectional elevation view of a draft gear assembly which is constructed in accordance with yet another embodiment of the present invention.
Figure 6:
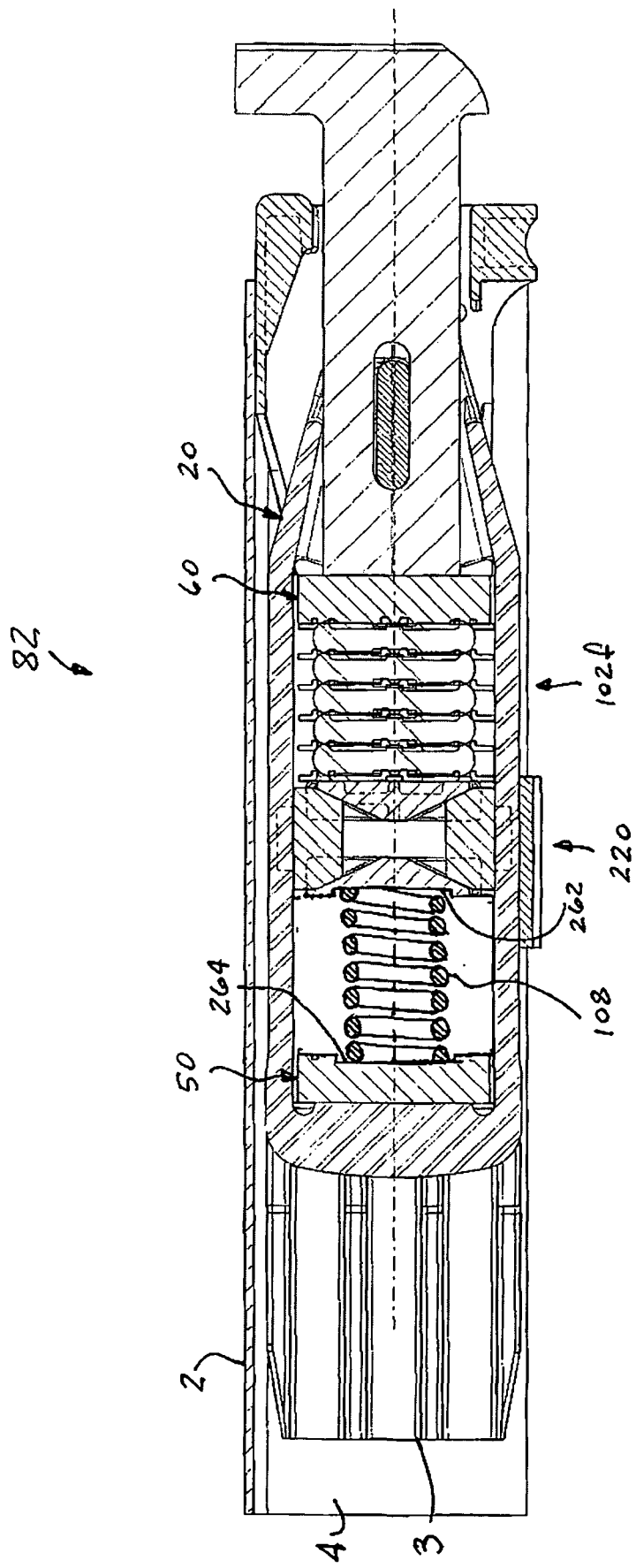
FIG. 6 is a cross-sectional planar view of a draft gear assembly which is constructed in accordance with a further embodiment of the present invention.

The rear stops 3 are secured to inner wall surfaces 4 of the center sill 2, as best shown in FIGS. 3, 5 and 6.

The front coupler follower 60 is also positioned intermediate the top and the bottom strap members, 30 and 40 respectively and transversely to the central axis 21 of the yoke 20. The front coupler follower 60 is sized to abut a pair of front stops 8, best shown in FIG. 5, which are formed on a rear portion of the striker casing 5 engaging the center sill 2 when the draft gear assembly 70 is in a position to cushion the draft shocks. The front coupler follower 60 further abuts the shank 12 of the coupler 10 in a conventional manner.

The draft gear assembly of the present invention essentially includes at least one resilient cushioning member which is centrally mounted within the yoke 20 in combination with a friction mechanism, generally designated as 220. The longitudinal axis of the at least one resilient cushioning member is aligned with a longitudinal central axis 21 of the yoke 20.

It is presently preferred for such resilient cushioning member to be constructed substantially identical, except for length, to the spring 102 disclosed in a co-pending U.S. Ser. No. 12/150,809 entitled "Compressible Elastomeric Spring" filled concurrently therewith. It is further presently preferred to provide the plates as disclosed in the co-pending U.S. Ser. No. 12/150,926 "Plate For A Compressible Elastomeric Spring" and provide the elastomeric pads as disclosed in the co-pending U.S. Ser. No. 12/150,928entitled "Elastomeric Pad For A Compressible Elastomeric Spring". Thus, for the sake of brevity, the detailed description of pads, plates and attachment means therebetween within the compressible elastomeric spring of the present invention will be omitted in this application. Briefly, the compressible elastomeric spring includes the predetermined plurality of pads 110 and separator plate like members 190 which form in combination a multi-tiered stack having a predetermined initial height, and whereby each of the predetermined plurality of pads 110 compresses and extends along the central axis 21 of the yoke 20 causing movement of each of the predetermined plurality of separator plate like members 190 along the central axis 21 during cushioning of the buff and draft dynamic impact forces (shocks).

Now in reference to FIG. 1 and in accordance with one embodiment of the present invention, a draft gear assembly, generally designated as 76, is provided and includes a single compressible elastomeric spring 102e mounted axially intermediate the rear coupler 50 and the front follower coupler 60 for absorbing and cushioning buff and draft dynamic impact forces (shocks) applied to the draft gear assembly 76 through the coupler shank 12.

Figure 4:
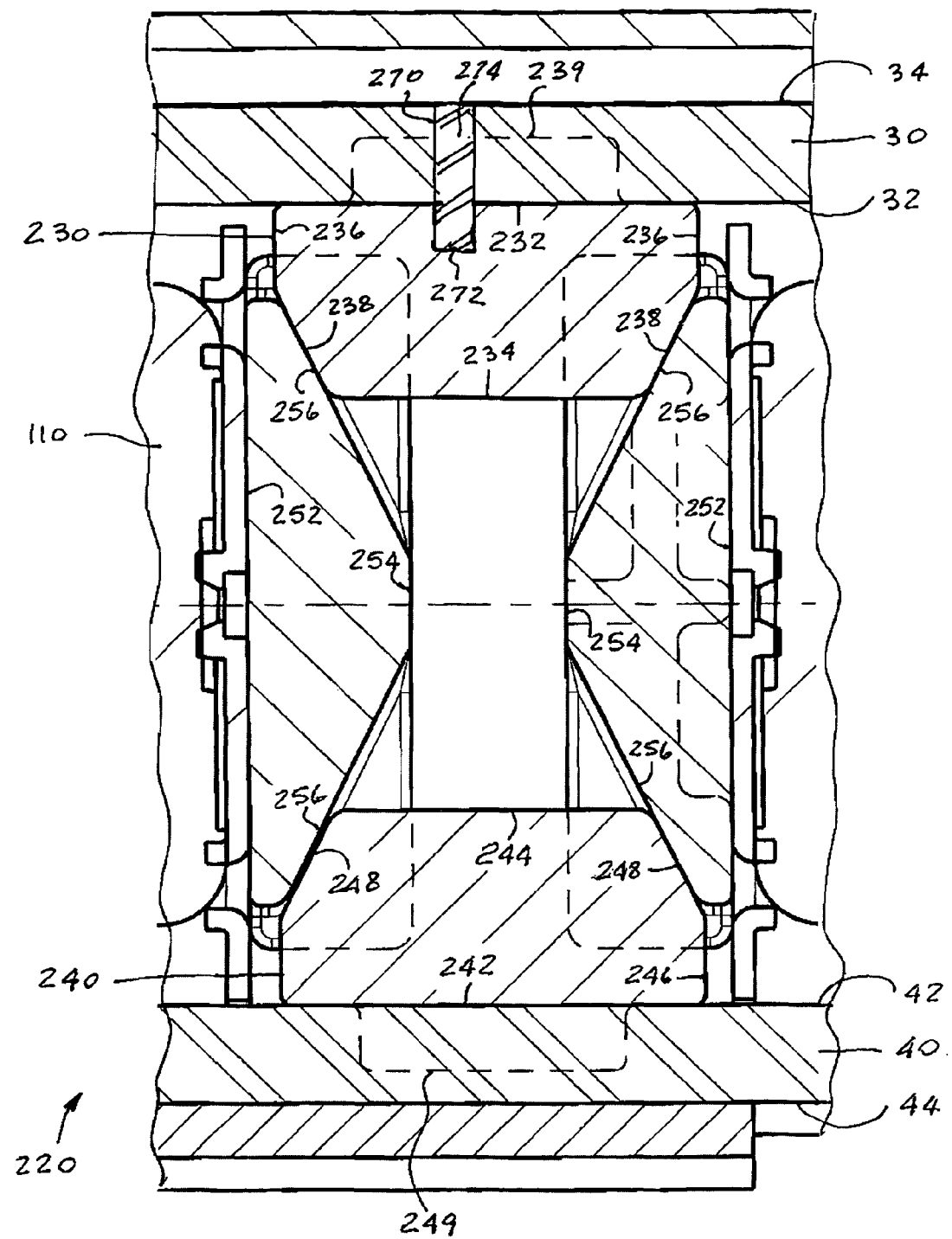
FIG. 4 is an enlarged partial cross-sectional elevation view of the draft gear assembly of FIG. 3, particularly illustrating a friction mechanism constructed in accordance with a presently preferred embodiment of the present invention.

The draft gear assembly 76 further includes the friction mechanism 220 which can be better seen in an enlarged view of FIG. 4. In the embodiment of FIG. 1, the friction mechanism 220 engages the front end of the spring 102e and is positioned for axial movement within the yoke 20. The friction mechanism 220 includes a first friction member 230 having a first horizontally disposed planar surface 232, a second horizontally disposed opposed surface 234, and a pair of axially opposed and vertically disposed ends 236. Each end 236 has a tapered friction portion 238 which tapers downwardly and inwardly when the first friction member 230 in installed within the yoke 20. The angle at which the tapered portion 238 tapers depends on the desired absorbing capacity of the draft gear 76 and construction and material of the resilient cushioning member 102e. A second friction member 240 is also provided and is vertically spaced from the first friction member 230. The second friction member 240 has a first horizontally disposed planar surface 242, a second opposed horizontally disposed surface 244, and a pair of axially opposed and vertically disposed ends 246. Each end 246 has a tapered friction portion 248 which tapers upwardly and inwardly when the second friction member 240 is installed within the yoke 20. Preferably, the second friction member 240 is substantially identical to the first friction member 230. There is also a pair of vertically positioned and spaced apart wedges 250, each having a generally flat first surface 252 and a pair of tapered friction portions 256 formed in an opposed second surface 254. Each tapered friction portion 256 matches and frictionally engages a respective tapered portion 238, 248 formed in a respective end of the first friction member 230 and the second friction member 240.

The first planar surface 232 of the first friction member 230 abuts and axially moves about the inner surface 32 of the top strap member 30 of the yoke 20. Preferably, the first friction member 230 includes a pair of spaced apart flanges 239 which extend outwardly in a vertical direction from each end of the first planar surface 232 and engage side edges 36 of the top strap member 30 for guiding axial movement of the friction mechanism 220 and the elastomeric compressible spring 102e as well as for preventing lateral movement thereof. Preferably, the flanges 239 are formed integral with the first friction member 230. However, if required during installation, one of both flanges 239 may be secured to the first planar surface 232 with the use of conventional threaded fasteners 239a by providing apertures 239b formed vertically through such flange 239 and a complimentary threaded aperture or bore (not shown) formed vertically through or within the first planar surface 232.

Likewise, the first planar surface 242 of the second friction member 240 abuts and axially moves about the inner surface 42 of the bottom strap member 40 of the yoke 20. Pair of spaced apart flanges 249, at least one of secured to and formed integral with the first planar surface 242 extend outwardly in a vertical direction from each end of the first planar surface 242 and also engage side edges 46 of the bottom strap member 40 for guiding axial movement of the friction mechanism 220 and the elastomeric compressible spring 102e.

The friction mechanism 220 is shown as positioned adjacent the front end 32 of the yoke 30 in abutting relationship with a front end of the compressible elastomeric spring 102e. In this arrangement, the friction mechanism 220 multiplies the resisting force of the compressible elastomeric spring 102e, by way of frictional engagement of the tapered friction portions 238 and 248 with respective matching tapered friction portions 255, thus increasing energy absorption of the draft gear assembly 76 during cushioning of the buff and draft dynamic impact forces (shocks).

Figure 2:
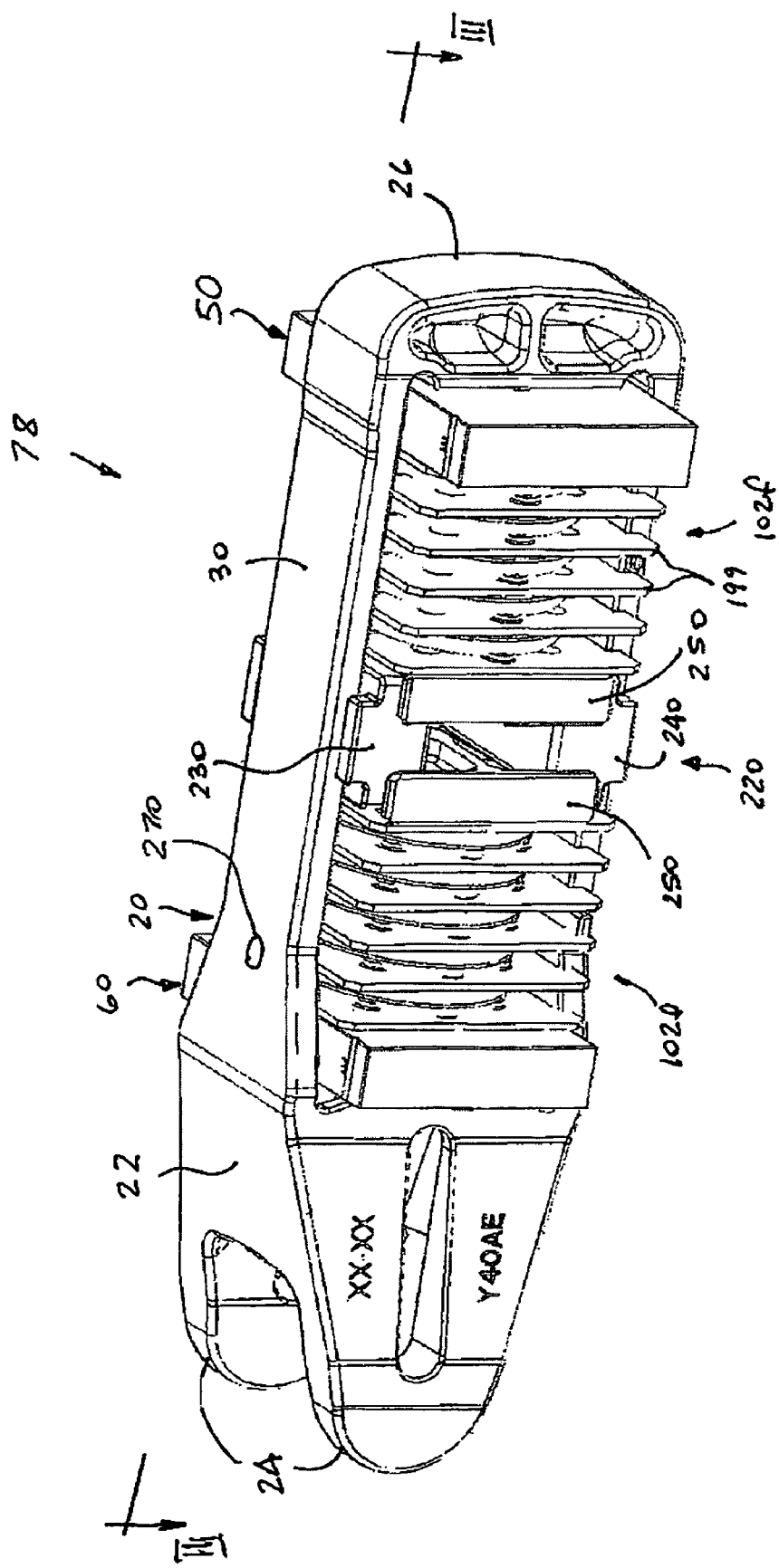
FIG. 2 is an isometric view illustrating a draft gear assembly which is constructed in accordance with another embodiment of the present invention.

The spring 102e may be simply positioned between the rear follower 50 and the friction mechanism 220 in a conventional pre-compressed manner. If desired for a particular application, it is contemplated by the present invention that the draft gear assembly 76 may include a locating means for locating front end of the spring 102e on the inwardly positioned wedge 250 and for locating the rear end of the spring 102e on the inner surface 52 of the rear follower 50 in a manner generally identical of locating end of the spring on the face of the central plate 200 in FIGS. 5-6 of the co-pending U.S. Ser. No. 12/150,777entitled "Combination Yoke and Elastomeric Draft Gear", except that each face surface of the center plate 200 will be replaced by the surface 252 of each wedge 250 or by the inner surface 52 of the rear coupler 50. The detail description of such locating means will be omitted in this document for the sake of brevity. If further required for guiding purposes, each bottom and/or top horizontally disposed edge of the plate like members 150, 190 may be positioned in abutting engagement with respective inner surfaces 32, 42 of the yoke 20. Yet further, a bottom and/or top horizontally disposed edge of at least one the plate like members 190 may be provided with flanges 199 positioned in abutting engagement with the side edges 36, 46 of the yoke 30. Such flanges 199 disposed on the bottom edge of the plate like members 190 are best shown in FIGS. 1 and 2.

It is within the scope of the present invention to provide a one-piece member combining the front follower 60 with an adjacently disposed wedge 250. For example, tapered portions 256 of the wedge 250 may be integrally formed with the inner surface 62 of the front follower 60 by a casting method or the wedge 250 may be rigidly secured to the inner surface 62, for example, by a welding method.

It is further within the scope of the present invention to provide the compressible elastomeric spring 102e having the rear coupler 50 secured to the rear end thereof as disclosed in the co-pending U.S. Ser. No. 12/150,777 entitled "Combination Yoke and Elastomeric Draft Gear".

It is also within the scope of the present invention to provide means for pre-shortening the draft gear assembly 76 of FIG. 1 during installation into the sill 2, particularly, when the springs 102e and friction mechanism 220 are preinstalled into the yoke 20. In the presently preferred embodiment of the invention, such pre-shortening means may include an aperture 270 formed through at least one of the top strap member 30 and the bottom strap member 40 of the yoke 20 and a complimentary bore 272 which is formed in at least one of the first planar surface 232 of the first planar surface 242 and shown in FIG. 4 as being formed in the first friction member 230. A pin 274 is passed through the aperture 270 and is received within the bore 272. The pin 272 is made from a conventional material enabling shearing of the pin 274 during the first application of the dynamic impact load. It is also within the scope of the present invention to provide other means of pre-shortening the draft gear assembly 76.

FIGS. 2-4 illustrate another embodiment of the present invention, wherein a draft gear assembly, generally designated as 78, is shown. The draft gear assembly 78 includes a pair of compressible springs 102f and the friction mechanism 220 which is positioned intermediate the inner ends of each spring 102f. In this arrangement, the friction mechanism 220 will increase energy absorption of the draft gear assembly 78 during both buff and draft dynamic impact forces (shocks) conditions.

It is contemplated that the interface between the inner ends of each spring 102f with the first surface 252 of a respective one of the pair of wedges 250 will be achieved generally identically to interfacing the center plate 200 in the draft gear assembly 72 of FIGS. 5-6 of the co-pending U.S. Ser. No. 12/150,777 entitled "Combination Yoke and Elastomeric Draft Gear", except that each face surface of the center plate 200 will be replaced by the first surface 252 of each wedge 250.

It is further contemplated that the above pre-shortening means described in combination with the draft gear assembly 76 of FIG. 1, may be employed in this embodiment, particularly, when the draft gear assembly 78 is installed into the yoke 20. The pin 274 may be arranged to engage a bore (not shown) formed in the front follower 60.

Now in further reference to FIG. 5, therein is illustrated yet another embodiment of the present invention, wherein the draft gear assembly, generally designated as 80, which is constructed generally identical to the draft gear assembly 78 of FIG. 2 except that the friction mechanism 220 is rotated ninety (90) degrees so that the first planar surface 232, 242 of each of the first and second friction members, 230 and 240 respectively, abut and slidingly move about a respective inner vertical surface 4 of the center sill 2 for providing axial guidance and for maintaining lateral stability of the compressible elastomeric springs 102f.

Although the draft gear assemblies of FIGS. 1-5 have been illustrated in terms of employing a compressible elastomeric springs 102e, 102, the present invention contemplates employment of other conventional spring types. Accordingly, as best illustrated in FIG. 6, a draft gear assembly, generally designated as 82, is shown and includes one coiled spring 108 which can be manufactured from steel or any other suitable material. A first end of the coiled spring 108 is received within a first spring seat 262 formed in an inner one of the pair of vertically positioned wedges 250 and having a second end thereof received within a second spring seat 264 formed in the rear follower 50. Each of such first spring seat 262 and second spring seat 264 may be a simple bore having each of a predetermined diameter and a predetermined depth. If a pair of axially aligned coil springs 108 are employed, identical seats 262, 264 will be formed in the opposed wedge 250 and the surface of the front coupler 60. When it is desirable to replace each spring 108 with a plurality of smaller diameter springs, a plurality of complimentary seats will be provided in the rear coupler 50, front coupler 60 and the wedges 250 of the friction mechanism 220. It will be understood, that the spring 108 may be simply installed in the draft gear 76 of FIG. 1.

Furthermore, a predetermined plurality of springs 100 disclosed in the co-pending U.S. Ser. No. 12/150,809 entitled "Compressible Elastomeric Spring" may be employed in the draft gear assemblies of FIGS. 1-6.

Although the present invention has been shown in terms of the front end 32 of the yoke 30 being connected to a standard E-shank coupler, it will be apparent to those skilled in the art that the present invention can be applied to standard F-shank or rotary couplers.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. In combination with an elongated yoke having a pair of spaced apart top and bottom strap members and removably mountable within a hollow center sill of a railway vehicle body, a draft gear assembly for cushioning buff and draft dynamic impact forces being applied to said center sill member during make-up of a train consist and in-track operation of said train, said draft gear assembly comprising:

(a) at least one compressible elastomeric spring member disposed between said pair of top and bottom strap members of said yoke for at least absorbing and dissipating said dynamic impact forces, said at least one compressible elastomeric spring member having a longitudinal axis thereof aligned with a longitudinal central axis of said yoke; and (b) a friction mechanism disposed in abutting engagement with one end of said at least one compressible elastomeric spring member and is further disposed in direct contact with at least one predetermined portion of said pair of top and bottom strap members of said yoke.

2. The draft gear assembly, according to claim 1, wherein said draft gear assembly further includes means for shortening said draft gear assembly prior to installation into the center sill.

3. The draft gear assembly, according to claim 2, wherein said shortening means includes an aperture formed in one of said first and second strap members adjacent said front end of said yoke, a bore formed in one of a top edge and a bottom edge of said friction mechanism in alignment with said aperture formed in said one of said first and second strap members and a pin member which is inserted through said aperture and into said bore, said pin formed from a predetermined material which will shear during a first application of the dynamic impact load.

4. A draft gear assembly for cushioning both buff and draft impact forces being applied to a center sill member of a railway vehicle during make-up of a train consist and in-track operation of the train consist, said draft gear assembly comprising:
    (a) an elongated yoke removably mountable within a hollow center sill of a railway vehicle body, said yoke having a yoke head which is adapted to connect to an end of a coupler shank, a butt end axially opposing said yoke head, a pair of elongated, substantially parallel spaced-apart top and bottom strap members each having an inner surface, an outer surface, a front end and a rear end, said rear end of each strap member being joined to said butt end of said yoke and said front end of said each strap member being joined to said yoke head;
    (b) a rear follower positioned intermediate said top and said bottom strap members transversely to a longitudinal central axis of said yoke, said rear follower sized to abut each of a draft gear seat formed within said butt end of said yoke and a pair of rear stops secured to the center sill when said draft gear assembly is in a position to cushion the buff dynamic impact forces;
    (c) a front coupler follower positioned intermediate said top and said bottom strap members transversely to said central axis of said yoke, said front coupler follower sized to abut a pair of front stops formed in a striker casing engaging the center sill when said draft gear assembly is in a position to cushion the draft dynamic impact forces;
    (d) a compressible elastomeric spring member mounted between said pair of top and bottom strap members of said yoke, said compressible elastomeric spring member having a longitudinal axis thereof aligned with a longitudinal central axis of said yoke, said compressible elastomeric spring member having a rear end thereof abutting an inner surface of said rear follower; and
    (e) a friction mechanism disposed in abutting engagement with one end of said compressible elastomeric spring member and is further disposed in direct contact with at least one of said pair of top and bottom strap members.

5. The draft gear assembly, according to claim 4, wherein said friction mechanism includes:
    (a) a first friction member having each of a first planar surface, a second opposed surface, and a pair of axially opposed ends each having a tapered friction portion formed therein;
    (b) a second friction member having each of a first planar surface, a second opposed surface, and a pair of axially opposed ends each having a tapered friction portion formed therein, said second friction member is aligned with said first friction member and is spaced therefrom; and
    (c) a pair of vertically disposed and axially spaced apart wedges, each of said pair of wedges having a generally flat first surface and a pair of tapered friction portions formed in an opposed second surface, each tapered friction portion of said each wedge matching and frictionally engaging a respective tapered portion formed in a respective end of said first friction member and said second friction member.

6. The draft gear assembly, according to claim 5, wherein said first planar surface of said first friction member abuts and slidingly moves about said inner surface of said top strap member of said yoke.

7. The draft gear assembly, according to claim 6, wherein said first friction member includes a pair of spaced apart flanges, each of said pair of flanges extending outwardly from a respective end of said first planar surface of said first friction member and abuttingly engaging a respective side edge of said top strap member for guiding axial movement of said friction mechanism and said compressible elastomeric spring member, whereby said pair of flanges cage a portion of said top strap member therebetween.

8. The draft gear assembly, according to claim 5, wherein said first planar surface of said second friction member abuts and slidingly moves about said inner surface of said bottom strap member of said yoke.

9. The draft gear assembly, according to claim 8, wherein said second friction member includes a pair of spaced apart flanges, each of said pair of flanges extending outwardly from a respective end of said first planar surface of said second friction member and abuttingly engaging a respective side edge of said bottom strap member for guiding axial movement of said friction mechanism and said compressible elastomeric spring member, whereby said pair of flanges cage a portion of said bottom strap member therebetween.

10. The draft gear assembly, according to claim 5, wherein said first planar surface of each of said first friction member and said second friction member abuts and slidingly moves about a respective inner vertical surface of the center sill.

11. The draft gear assembly, according to claim 5, wherein said second friction member and said first friction member are spaced from each other in a vertical direction when said draft gear assembly is installed for cushioning such buff and draft dynamic impact forces.

12. The draft gear assembly, according to claim 5, wherein said second friction member and said first friction member are spaced from each other in a horizontal direction when said draft gear assembly is installed for cushioning the buff and draft dynamic impact forces.

13. The draft gear assembly, according to claim 4, wherein said compressible elastomeric spring member includes a multi-tier stack having a predetermined plurality of elastomeric pads separated by a predetermined plurality of plate members, each of said predetermined plurality of elastomeric pads and each of said predetermined plurality of plate members positioned transversely to said central axis of said yoke and laterally within the center sill, wherein said each of said predetermined plurality of elastomeric pads is compressed along said central axis toward said rear follower to cushion the buff dynamic impact forces and is compressed along said central axis toward said front coupler follower to cushion the draft dynamic impact forces, and wherein said each of said predetermined plurality of plate members moves along said central axis during cushioning of the buff and draft dynamic impact forces.

14. The draft gear assembly, according to claim 13, wherein said draft gear assembly further includes means for maintaining axial alignment of said compressible elastomeric spring member.

15. The draft gear assembly, according to claim 14, wherein said alignment maintaining means includes said each of said predetermined plurality of plate members having each horizontal side edge thereof positioned in abutting relationship with said inner surface of at least one of a respective top and bottom strap member.

16. The draft gear assembly, according to claim 4, wherein said draft gear assembly further includes means for locating said rear end of said elastomeric compressible spring member on said inner surface of said rear follower.

17. The draft gear assembly, according to claim 4, wherein said draft gear assembly further includes means for locating said front end of said elastomeric compressible spring member on a predetermined portion of said friction mechanism.

18. A draft gear assembly for cushioning both buff and draft impact forces being applied to a center sill member of a railway vehicle during make-up of a train consist and in-track operation of the train consist, said draft gear assembly comprising:
  (a) an elongated yoke removably mountable within a hollow center sill of the railway vehicle body, said yoke having a front end which is adapted to connect to an end of a coupler shank, a rear end axially opposing said front end, a pair of elongated, substantially parallel spaced-apart top and bottom strap members each having an inner surface, an outer surface, a front end and a rear end, said rear end of each strap member being joined to said rear end of said yoke and said front end of said each strap member being joined to said front end of said yoke;
  (b) a rear follower positioned intermediate said top and said bottom strap members transversely to a longitudinal axis of said yoke, said rear follower sized to abut said rear end of said yoke and a pair of rear stops secured to the center sill when said draft gear assembly is in a position to cushion the buff dynamic impact forces;
  (c) a front follower positioned intermediate said top and said bottom strap members transversely to said longitudinal axis of said yoke, said front follower sized to abut a pair of front stops formed in a striker casing engaging the center sill when said draft gear assembly is in a position to cushion the draft dynamic impact forces;
  (d) a first compressible elastomeric spring member mounted within said yoke, said first compressible elastomeric spring member having a longitudinal axis thereof aligned with said longitudinal axis of said yoke, said first compressible elastomeric spring member having a rear end thereof abutting an inner surface of said rear follower;
  (e) a second compressible elastomeric spring member mounted within said yoke, said second compressible elastomeric spring member having a longitudinal axis thereof aligned with said longitudinal axis of said yoke, said second compressible elastomeric spring member having a front end thereof abutting an inner surface of said front coupler follower; and
  (f) a friction mechanism disposed in abutting engagement between a front end of said first resilient spring member and a rear end of said second compressible elastomeric spring member and is further disposed in direct contact with at least one predetermined portion of said pair of top and bottom strap members of said yoke.

19. The draft gear assembly, according to claim 18, wherein said draft gear assembly further includes means for maintaining axial alignment of at least one of said first and second compressible elastomeric spring members.

20. In combination with a compressible resilient spring member disposed in a draft gear assembly, a friction mechanism for said draft gear assembly to be installed within a center sill of a railway vehicle for cushioning both buff and draft dynamic impact forces being applied to the center sill member during make-up of a train consist and in-track operation of the train consist, said friction mechanism includes:
  (a) a first friction member having each of a first planar surface, a second opposed surface, and a pair of axially opposed ends each having a tapered friction portion formed therein disposed at a first end of said compressible resilient spring member;
  (b) a second friction member having each of a first planar surface, a second opposed surface, and a pair of axially opposed ends each having a tapered friction portion formed therein, said second friction member is aligned with said first friction member and is spaced therefrom disposed at a second radially opposed end of said compressible resilient spring member;
  (c) a pair of vertically disposed and axially spaced apart wedges, each of said pair of wedges having a generally flat first surface and a pair of tapered friction portions formed in an opposed second surface, each tapered friction portion of said each wedge matching and frictionally engaging a respective tapered portion formed in a respective end of said first friction member and said second friction member; and
  (d) whereby a portion of at least one of said first and second friction members and pair of wedges directly contact a predetermined portion of said draft gear assembly.

21. In combination with a hollow center sill of a railway vehicle body a draft gear assembly for cushioning both buff and draft impact forces being applied to said center sill member of said railway vehicle during make-up of a train consist and in-track operation of the train consist, said draft gear assembly comprising:
  (a) a rear follower positioned to abut pair of rear stops secured to said hollow center sill when said draft gear assembly is in a position to cushion the buff dynamic impact forces;
  (b) a front coupler follower positioned to abut a pair of front stops formed in a striker casing engaging said hollow center sill when said draft gear assembly is in a position to cushion the draft dynamic impact forces;
  (c) at least one compressible elastomeric spring member mounted within said hollow center sill between said rear and front coupler followers, said compressible elastomeric spring member having a longitudinal axis thereof aligned with a longitudinal central axis of said hollow center sill; and
  (d) a friction mechanism disposed in abutting engagement with one end of said at least one compressible elastomeric spring member and is further disposed in direct contact with said sill.

22. A draft gear assembly for cushioning both buff and draft impact forces being applied to a center sill member of a railway vehicle during make-up of a train consist and in-track operation of the train consist, said draft gear assembly comprising:
  (a) an elongated yoke removably mountable within a hollow center sill of a railway vehicle body, said yoke having a yoke head which is adapted to connect to an end of a coupler shank, a butt end axially opposing said yoke head, a pair of elongated, substantially parallel spaced-apart top and bottom strap members each having an inner surface, an outer surface, a front end and a rear end, said rear end of each strap member being joined to said butt end of said yoke and said front end of said each strap member being joined to said yoke head;
  (b) at least one compressible elastomeric spring member mounted between said top and bottom strap members of said yoke, said compressible elastomeric spring member having a longitudinal axis thereof aligned with a longitudinal central axis of said yoke;
(c) a first friction member having each of a substantially planar first surface, an opposed second surface, and a pair of axially opposed ends each having a tapered friction portion formed therein;
(d) a second friction member having each of a substantially planar first surface, an opposed second surface, and a pair of axially opposed ends each having a tapered friction portion formed therein, said second friction member is aligned with said first friction member and is spaced therefrom;
(e) a pair of vertically disposed and axially spaced apart wedges, each of said pair of wedges having a generally flat first surface and a pair of tapered friction portions formed in an opposed second surface, each tapered friction portion of said each wedge matching and frictionally engaging a respective tapered portion of a respective end of said first friction member and said second friction member; and
(f) at least a pair of spaced apart flanges, each of said pair of flanges extending outwardly from a respective end of said substantially planar first surface of one of said first and second friction members and abuttingly engaging a respective side edge of a respective strap member, whereby said pair of flanges cage a portion of said respective strap member therebetween.

* * * * *